United States Patent
Beller et al.

(10) Patent No.: US 10,311,050 B2
(45) Date of Patent: Jun. 4, 2019

(54) CROWDSOURCED DISCOVERY OF PATHS IN A KNOWLEDGE GRAPH

(71) Applicant: INTERNATIONAL BUSINESS MACHINES CORPORATION, Armonk, NY (US)

(72) Inventors: Charles E. Beller, Baltimore, MD (US); Donna K. Byron, Petersham, MA (US); Benjamin L. Johnson, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 15/413,103

(22) Filed: Jan. 23, 2017

(65) Prior Publication Data

US 2018/0210913 A1 Jul. 26, 2018

(51) Int. Cl.
G06F 17/30 (2006.01)
G06F 16/242 (2019.01)
G06F 16/901 (2019.01)

(52) U.S. Cl.
CPC ........ G06F 16/243 (2019.01); G06F 16/9024 (2019.01)

(58) Field of Classification Search
USPC ................. 707/737, 758, 797, 798
See application file for complete search history.

(56) References Cited

U.S. PATENT DOCUMENTS

| 7,555,472 | B2 | 6/2009 | Craig et al. |
| 8,407,253 | B2 | 3/2013 | Ryu et al. |
| 9,832,159 | B1* | 11/2017 | Kursun ................... H04L 51/16 |
| 2014/0280307 | A1 | 9/2014 | Gupta et al. |
| 2014/0297644 | A1 | 10/2014 | Cheng |
| 2014/0379755 | A1* | 12/2014 | Kuriakose ........... G06F 17/3043 707/780 |
| 2015/0074034 | A1* | 3/2015 | Ait-Mohktar ..... G06F 17/30929 706/50 |
| 2015/0363461 | A1* | 12/2015 | Behal ................ G06F 17/30424 707/722 |

(Continued)

OTHER PUBLICATIONS

Hakkani-Tur et al.; Ttl: Probabilistic enrichment of knowledge graph entities for relation detection in conversational understanding; Publication Ttl: Proceedings of the Annual Conference of the International Speech Communication Association, Interspeech, pp. 2113-2117; 2014; Publisher: International Speech and Communication Association; Country of Publication: France; ISSN: 2308457X; Database: Ei Compendex.

(Continued)

*Primary Examiner* — Hung T Vy
(74) *Attorney, Agent, or Firm* — Conley Rose, P.C.

(57) ABSTRACT

The disclosed embodiments include a system, computer program product, and computer-implemented method configured to modify a knowledge graph. The disclosed embodiments seek to improve the process of expanding a knowledge graph by identifying information that is useful and relevant to the needs of the users based on questions being asked by users. In one embodiment, the information is collected using a gaming platform. The disclosed embodiments augment the knowledge graph, by adding new entities and/or relationships, based on the gathered information.

17 Claims, 4 Drawing Sheets

(56) References Cited

U.S. PATENT DOCUMENTS

2016/0098645 A1     4/2016  Sharma et al.
2016/0224637 A1*    8/2016  Sukumar ........... G06F 17/30539
2016/0314121 A1*   10/2016  Arroyo .................... G06N 5/02
2017/0262551 A1*    9/2017  Cho ................. G06F 17/30598

OTHER PUBLICATIONS

Von Ahn "Games with a Purpose," Computer, Jun. 2006, pp. 96-98.
Khatiba, et al., "Algorithm Discovery by Protein Folding Game Players," Proceedings of the National Academy of Sciences, 108.47, 2011, pp. 18949-18953.
Zhang, et al., "Joint Semantic Relevance Learning with Text Data and Graph Knowledge," Proceedings of the 3rd Workshop on Continuous Vector Space Models and Their Compositionality (CVSC), Beijing, China, Jul. 26-31, 2015, pp. 32-40.

* cited by examiner

CROWDSOURCED DISCOVERY OF PATHS IN A KNOWLEDGE GRAPH

STATEMENT REGARDING FEDERALLY SPONSORED RESEARCH OR DEVELOPMENT

This invention was made with Government support under contract number 2013-12101100008. The Government has certain rights to this invention.

BACKGROUND

The present disclosure relates generally to the field of semantic queries. Semantic queries enable the retrieval of both explicitly and implicitly derived information based on syntactic, semantic and structural information contained in data. Semantic queries often involve the use of a knowledge base. A knowledge base may store complex structured and unstructured information used by a computer system. A knowledge graph depicts the relationship between various entities contained in the knowledge base.

SUMMARY

The present disclosure includes various embodiments including a system, computer-implemented method, computer program product for improving a knowledge graph. The disclosed embodiments seek to improve the process of expanding a knowledge graph by identifying information that is useful and relevant to the needs of the users based on questions being asked by users. In one embodiment, the information is collected using a gaming platform. The disclosed embodiments augment the knowledge graph, by adding new entities and/or relationships, based on the gathered information.

As an example, the disclosed embodiments include a computer-implemented method for modifying a knowledge graph. The computer-implemented method includes the step of receiving a question and determining a first entity and a second entity from the question. The computer-implemented method determines whether a knowledge gap exists between the first entity and the second entity in the knowledge graph. In one embodiment, a knowledge gap exists if there is less than a predetermined number of connection paths between the first entity and the second entity that are within a predetermined number of hops. The computer-implemented method performs a request to collect information to correct the knowledge gap in the knowledge graph in response to a determination that the knowledge gap exists between the first entity and the second entity in the knowledge graph. In one embodiment, the request for information is implemented in a gaming application. The computer-implemented method receives the information based on the request and validates the information. The computer-implemented method updates the knowledge graph based on the information in response to the information being validated.

The disclosed embodiments also include a system configured to modify a knowledge graph. In one embodiment, the system includes a processor configured to execute instructions to receive a question and determine a first entity and a second entity from the question. The processor further executes instructions to determine whether a knowledge gap exists between the first entity and the second entity in the knowledge graph; perform a request to collect information to correct the knowledge gap in the knowledge graph in response to a determination that the knowledge gap exists between the first entity and the second entity in the knowledge graph; receive the information based on the request; validate the information; and update the knowledge graph based on the information in response to the information being validated.

Another disclosed embodiment is a computer program product comprising a computer readable storage medium having program instructions embodied therewith, the program instructions executable by a processor. Executing the program instructions causes the processor to receive a question; determine a first entity and a second entity from the question; determine whether a knowledge gap exists between the first entity and the second entity in the knowledge graph; and perform a corrective action to correct the knowledge gap in the knowledge graph in response to a determination that the knowledge gap exists between the first entity and the second entity in the knowledge graph.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
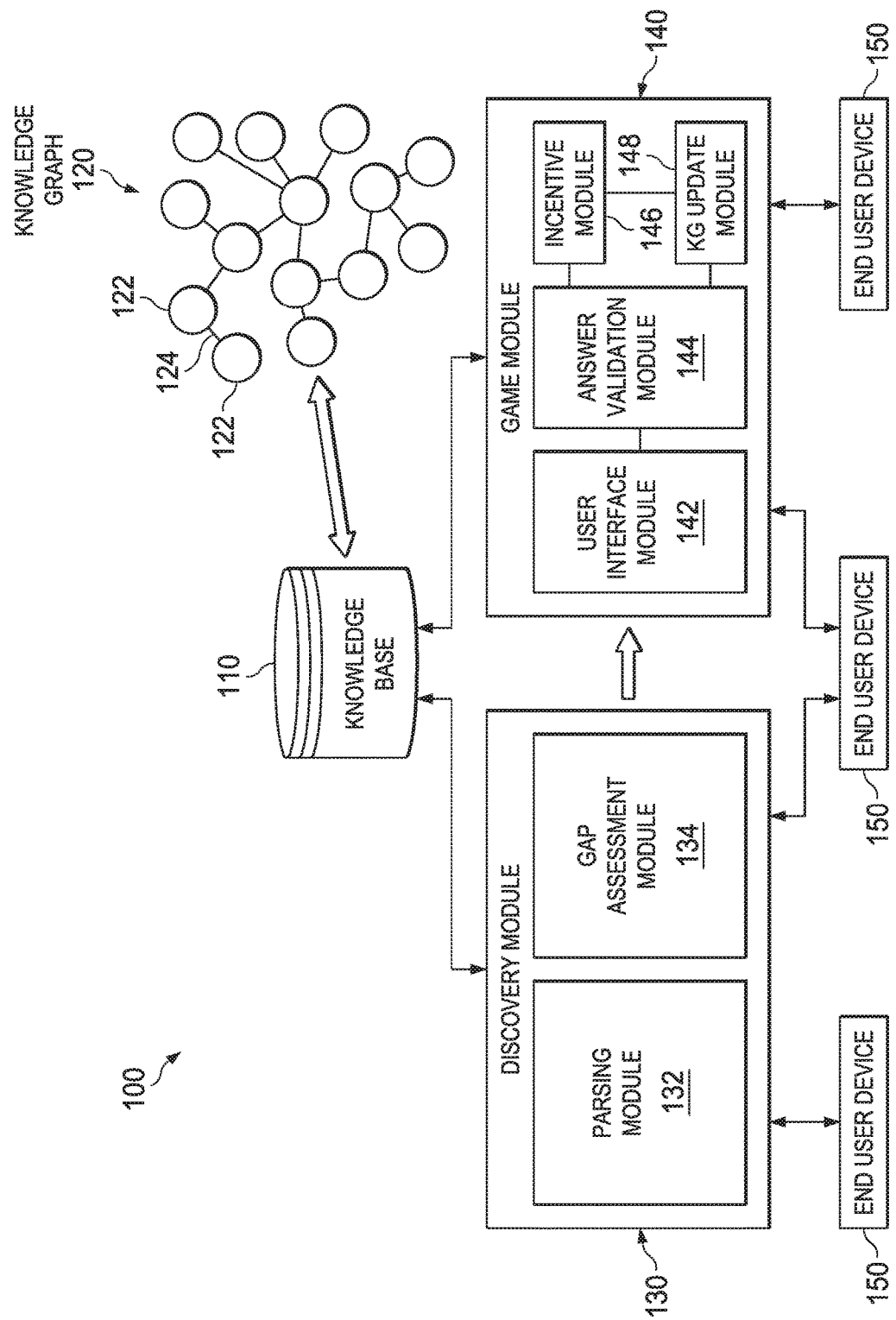
FIG. 1 is a block diagram illustrating a system for improving a knowledge graph according to an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As referenced herein, the term database or knowledge base is defined as collection of structured or unstructured data. Although referred in the singular form, the database may include one or more databases, and may be locally stored on a system or may be operatively coupled to a system via a local or remote network.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise. Also, as used herein, the term "module" refers to a component or function that is part of program or system, and may be implemented in software, hardware, or a combination thereof. The software portion of a module may be implemented using any form of computer readable program instructions as described herein.

As stated above, existing knowledge graphs have been shown to be useful for semantic search. One downside of existing knowledge graphs, particularly ones representing common sense or world knowledge, is that they are often sparse in terms of how many edges (relations) they contain. Additionally, these edges are usually representative of subsumption or location relationships (e.g., "Ben was born in Baltimore," or "Apples are fruit"), other types of relationships are quite sparse. However, the space of all possible missing elements of a knowledge graph is vast. Extending the knowledge graph with random new knowledge may not contribute to improved performance of the systems that draw on the knowledge stored in the knowledge graph, and encompasses a lot of time and effort.

Thus, the disclosed embodiments seek to improve the process of expanding a knowledge graph by identifying information that is useful and relevant to the needs of the users, and automatically gathering that information and augmenting the knowledge graph, by adding new entities and/or relationships, based on the gathered information. The extended knowledge graph can then be used to provide answers to questions that were previously not answerable using the old knowledge graph. Another advantage in the disclosed embodiments is that it is more responsive to user inputs and can be adaptive with the much lower latency than existing systems. For example, if a new item of interest shows up with user queries, due to for example an event in the news or a suggested linkage between a TV personality and a favorite childhood vacation spot, the knowledge elicitation method opportunistically augments the knowledge graph to help serve additional user requests.

With reference now to FIG. 1, a system 100 for improving a knowledge graph according to an embodiment of the present disclosure is presented. The system 100 includes a knowledge base 110, a discovery module 130, a game module 140, and one or more end user devices 150. In various embodiments, the knowledge base 110, the discovery module 130, and the game module 140 may be implemented on one system or multiple systems. For example, in one embodiment, the knowledge base 110 may be implemented on a first system, while the discovery module 130 and the game module 140 are implemented on a second system. In another embodiment, the knowledge base 110 may be implemented on a first system, the discovery module 130 may be implemented on a second system, and the game module 140 may be implemented on a third system. Further, although the depicted embodiment describes the discovery module 130 and the game module 140 as separate modules, in some embodiments, the discovery module 130 and the game module 140 may be combined and/or the functions described in each of the modules may be performed by the other modules.

The knowledge base 110 is a collection of data, which may include structured and unstructured data. In one embodiment, the knowledge base 110 is a graph database that stores a knowledge graph 120. The knowledge graph 120 may be generated from an existing knowledge graph such as, but not limited to, Yago™ and/or Freebase™. Alternatively, the knowledge graph 120 may be generated from scratch. The knowledge graph 120 comprises numerous entities 122 that have relationships or properties 124. Entities 122 represent real-world objects like people, places, and things. For example, an entity 122 may be labeled "car" that has a property 124 labeled "is-a" which connects to another entity 122 labeled "vehicle." In one embodiment, the entities 122 and properties 124 of the knowledge graph 120 are defined using Resource Description Framework (RDF). RDF is a standard model for data interchange on the Web. RDF extends the linking structure of the Web to use Uniform Resource Identifiers (URIs) to name the relationship (i.e., link or property 124) between things as well as the two ends of the link in the form of an RDF triple, which consist of a subject, predicate, and object. For instance, in the above example, the subject is a car, the predicate (i.e., property) is "is-a" which indicates that it is a type of, and the object is vehicle. The same entity 122 may have multiple properties 124. For example, the car entity may have another property labeled "manufacturer" that connects/links to the car's manufacturer. The car's manufacturer may have a property labeled "cars produced" that links to all the models of cars produced by that car manufacturer. Thus, using the knowledge graph 120, someone searching for information about a particular car, may also receive information about other cars produced by the same manufacturer. As easily recognizable, the knowledge graph 120 may expand indefinitely to include all types of information. As mentioned above, one aspect of the disclosed embodiments is to determine what useful information (i.e., information that is most likely to be asked by a user) is missing from the knowledge graph 120. Another aspect of the disclosed embodiments is to gather that missing information for automatically expanding the relation inventory by adding new entities or relations in the knowledge graph 120.

In one embodiment, the discovery module 130 is configured to receive a question from end user devices 150. Based on the received questions, the discovery module 130 is configured to determine the information that is useful and missing from the knowledge graph 120. In an embodiment, the discovery module 130 includes a parsing module 132 and a gap assessment module 134.

The parsing module 132 is configured to parse a question to identify entity pairs (e.g., car and manufacturer) in the question. In an embodiment, the parsing module 132 may be configured to determine the subject, predicate and object of the question in order to identify entity pairs. In an embodiment, the parsing module 132 may also be configured to perform tokenization and segmentation, morpholexical analysis, semantic analysis, and syntactic analysis. The parsing module 132 may also include a part-of-speech (POS) tagger to tag the parts of speech such as noun, verb, adjective, adverb, qualifier/intensifier, determiner, preposition, subordinating conjunction, and coordinating conjunction in order to identify entity pairs.

The gap assessment module 134 is configured to receive the entity pairs and for each entity pair, determine if there is a knowledge gap between the entity pairs in the knowledge graph 120. In one embodiment, a knowledge gap exists if there is less than a predetermined number of connection paths (N) between the two entities of the entity pair that are within a predetermined number (M) of hops (e.g., there may be only 2 connection paths between the two entities that are less than five hops). In one embodiment, the values for N and M may be predetermined based on a statistical analysis of the knowledge graph 120 to identify the number of connection paths and hops between entities that provide the most useful knowledge. In an embodiment, this statistical analysis may be performed in real-time as the knowledge graph 120 is updated. One purpose of the disclosed embodiments is to increase the number of connection paths between various entities and lower the number of hops between entities. For entity pairs that have less than the predetermined number of connection paths between the two entities that are within the predetermined number of hops, the gap assessment module 134 passes the entity pair on to the game module 140. In one embodiment, this selection process produces two types of ideal entity pairs that may require additional information. The first are the entity pairs that are distant/far away in the knowledge graph 120 as they are poorly related to each other. The second are the entity pairs that have few or no relations as there is a lack of relationship information. Other criteria for determining a knowledge gap in the knowledge graph 120 may also be suitable for use in the disclosed embodiments.

The game module 140 receives the entity pair from the gap assessment module 134 and is configured to gather the missing information related to the entity pair for populating the knowledge graph 120. The game module 140 may be implemented across any type of platform including personal computers, mobile devices using a mobile web interface or as a mobile application, and video gaming platforms. In an embodiment, the game module 140 includes a user interface module 142, an answer validation module 144, an incentive module 146, and a knowledge graph update module 148.

The user interface module 142 is configured to generate a user interface that enables a user of the end user devices 150 to provide information linking the entities in the entity pair. In one embodiment, the user interface may provide a set number of predefined relations that a user may select to link the two entities. For example, in an embodiment, the set number of predefined relations may include an indication that one entity is a theme of the other (e.g., heat is a theme of fire), that an entity is an agent of the other (e.g., a seamstress is the agent who performs a 'sew' action), or that an entity is a subgroup of the other (e.g., apple is a fruit). Additionally, the user interface may include a preset list of other existing entities in the knowledge graph 120 that a user may select as intermediate entities between the entity pairs. The other existing entities in the preset list may be selected based on their relationships with one or both of the entities in the entity pairs. In an embodiment, the game module 140 may include a restriction list that includes one or more sets of entities and/or relations that may not be used to construct paths within the knowledge graph 120. In other words, the user may be restricted from selecting a particular relationship between two entities and/or may be restricted from linking two entities together. One purpose for the restriction may be because a particular relationship between two entities is well-known or obvious. For example, linking a "person" entity to a "human being" entity does not provide any useful information that would add to the information already existing in the knowledge graph 120. Another reason for the restriction is that certain relations between two entities may be nonsensical. Thus, by restricting certain relationships between certain entities and/or by restricting the pairing of certain entities, the game module 140 generates useful information that is both missing from the knowledge graph 120 and likely to be requested from a user. Additionally, the knowledge graph 120 does not become bloated with useless information.

The answer validation module 144 is configured to validate a user's response. In one embodiment, the user's response may be validated manually by another user (e.g., an administrator or another participant). The user's response may also be validated automatically by comparing the user's answer to answers provided by other users to the same entity pair. For example, in an embodiment, if the same answer is given by a predetermined number of users to an answer pair, the answer validation module 144 validates that answer as accurate. Still, in an embodiment, a reliability rating may be assigned to a user based on responses provided by the user. For instance, if a user has an A reliability rating, then in one embodiment, the user's response may automatically be accepted as a correct response or may require less user validation than a response provided by a user with a lower reliability rating.

The incentive module 146 is configured to track the user's reliability rating or other point system for providing users with an incentive to participate in providing correct responses to the entity pair questions. In an embodiment, users may acquire more points and/or higher ratings for factual knowledge rather than common sense knowledge. For example, providing a particular location for place of birth would be a fact, whereas the knowledge that a person is born would be common sense knowledge. Users may also acquire more points and/or higher ratings for better or more complex answers than simple ones.

The point system or reliability rating may be used as a tracking mechanism simply for fun (e.g., a competition among friends) or may be used to provide the users with either monetary awards or other prizes. For instance, if a user acquires enough points, a user may be awarded a particular monetary amount and/or may be awarded a particular prize. If the disclosed embodiments are implemented internally within a corporation, the point system or reliability rating may also be used as part of an employee's review. For example, the disclosed embodiments may be used internally by a company to enable employees of the company to crowdsource their knowledge for expanding the knowledge graph 120. Employees may participate in the providing responses during their off time or during breaks. In some embodiments, the incentive module 146 may be configured to enable a group score to enable different departments of the company to compete. Similarly, a group of friends or a random group may be created from the general public to enable crowdsourcing of knowledge to populate the knowledge graph 120. Thus, the task of expanding the knowledge graph 120 becomes more like a game than actual work.

The knowledge graph update module 148 is configured to update the knowledge graph 120 with the new entities and/or relations after they are validated. In one embodiment, the knowledge graph update module 148 is configured to automatically generate an RDF triple or other knowledge graph insertion code containing the new entities and/or relations for modifying the knowledge graph 120.

As depicted in FIG. 1, the knowledge base 110, the discovery module 130, the game module 140, and the one or more end user devices 150 communicate with each other through a communication link 102. Communication link 102 may include both wired and wireless links. Communication link 102 may be a direct link or may comprise of multiple links passing through one or more communication network devices such as, but not limited to, routers, firewalls, servers, and switches. In some embodiments, communication link 102 may encompass various types of networks such as local-area networks (LANs), wide-area networks (WANs), and metropolitan-area networks (MANs). These networks may include private networks and/or public networks such as the Internet. For instance, as described above, the game module 140 may be implemented on a Web server and access by any Internet enabled user device 150. In an alternative embodiment, all the above described functions including those of the end user device 150 may be incorporated into one system, in which case, the communication link 102 represents the internal communication bus of the system.

As described herein, the end user device 150 is any type of electronic device that may be used by a user of the system 100 to ask a question and/or to provide missing information as described above. Non-limiting examples of end user devices 150 include a personal computer (desktop or laptop), mobile devices (e.g., personal digital assistant (PDA), smart phone, tablet), and dummy terminals that simply provide the interface for asking a question and/or for providing the missing information. In one embodiment, the same end user device 150 may be used for both tasks. In some embodiments, only designated end user devices 150 may be capable of interacting with the discovery module 130 and/or the game module 140.

Figure 2:
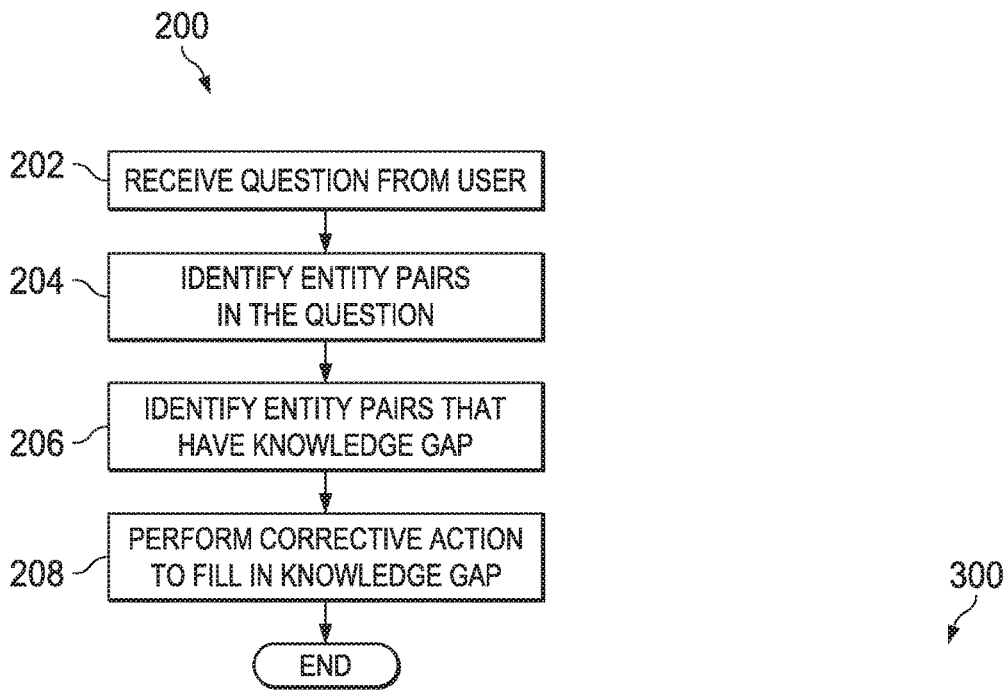
FIG. 2 is a flowchart of a computer-implemented method for improving a knowledge graph according to an embodiment of the present disclosure.
Figure 5:
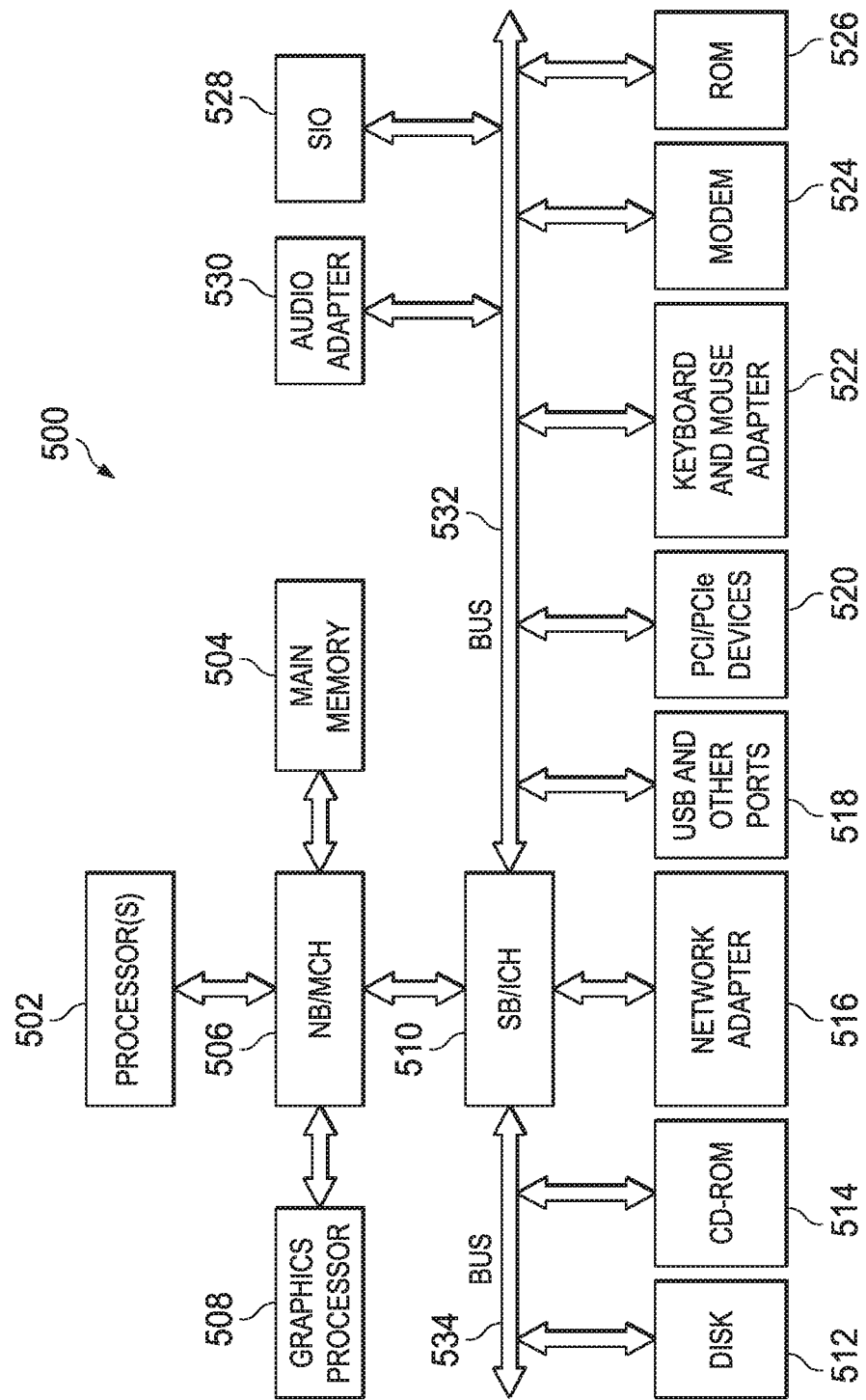
FIG. 5 is a data processing system according to an embodiment of the present disclosure.

FIG. 2 is a flowchart of a computer-implemented method 200 for improving a knowledge graph according to an embodiment of the present disclosure. In an embodiment, the computer-implemented method 200 may be implemented by a processor as shown in FIG. 5 by executing instructions associated with the discovery module 130 and the game module 140 as described in FIG. 1. In the depicted embodiment, the computer-implemented method 200 begins at step 202 by receiving a question from a user. The question may be received directly from the user or from another tool or system such as IBM Watson Discovery Advisor®. At step 204, the computer-implemented method 200 parses the question to identify entity pairs in the question. For example, in an embodiment, the computer-implemented method 200 identifies at least the subject/focus of the question and the object of the question as an entity pair. A question may include more than one subject and/or object. In an embodiment, the computer-implemented method 200 may generate entity pairs using synonyms for the subject or object of the question. As an example, the question may be "Which doorknob manufacturers are located in Croatia?" In this example, the computer-implemented method 200 may identify doorknob and Croatia as an entity pair. Using this example, at step 206, the computer-implemented method 200 determines if there is a knowledge gap between the entity pairs by querying the knowledge graph 120 for paths between doorknob and Croatia. In one embodiment, the computer-implemented method 200 determines that a knowledge gap exists if there are less than a predetermined number of connection paths between doorknob and Croatia that are within a predetermined number of hops. For example, in one embodiment, if the computer-implemented method 200 determines that there is not one connection path having less than five hops between doorknob and Croatia, then the computer-implemented method 200 determines that a knowledge gap exists. For each entity pair that the computer-implemented method 200 determines has a knowledge gap, the computer-implemented method 200 at step 208 is configured to perform corrective action to fill in the knowledge gap in the knowledge graph 120.

Figure 3:
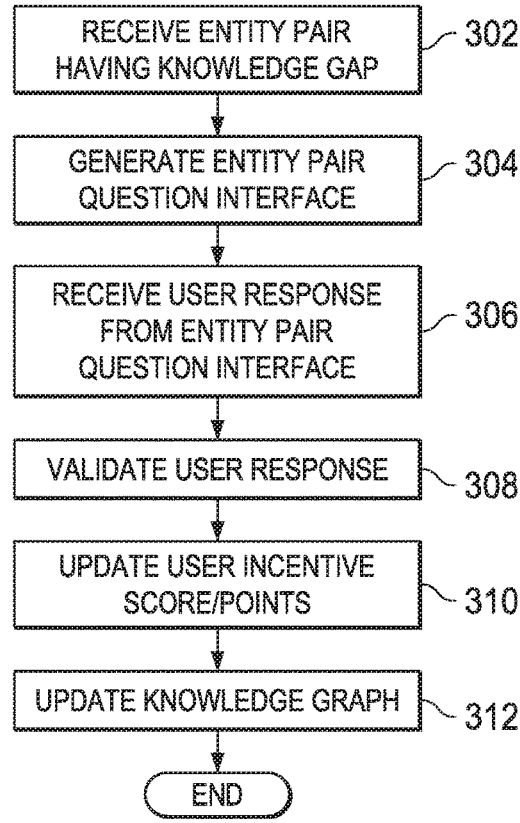
FIG. 3 is a flowchart of a computer-implemented method for performing corrective action to fill in a knowledge gap according to an embodiment of the present disclosure.

FIG. 3 is a flowchart of a computer-implemented method 300 for performing corrective action to fill in a knowledge gap according to an embodiment of the present disclosure. In an embodiment, the computer-implemented method 300 may be implemented by a processor as shown in FIG. 5 by executing instructions associated with the game module 140 as described in FIG. 1. The computer-implemented method 300 begins at step 302 by receiving an entity pair that has been determined to have a knowledge gap. At step 304, the computer-implemented method 300 generates a user interface for enabling a user to link the entities in the entity pair. In one embodiment, the computer-implemented method 300 retrieves a set of predefined relations and/or other existing entities in the knowledge graph 120 that a user may select to link the two entities. In an embodiment, the user interface may limit the user input to a certain number of hops/connections. Additionally, in some embodiments, the user interface may restrict the user input from selecting particular entities and/or relationships from being used to force the user to provide information that is both missing from the knowledge graph 120 and would be useful to include in the knowledge graph 120.

At step 306, the computer-implemented method 300 receives the user's response from the entity pair user interface. The computer-implemented method 300 validates the user's response at step 308. In one embodiment, the computer-implemented method 300 validates the user's response by comparing the user's answer to the answers provided by other users to same entity pair. In an embodiment, if the same or similar response is provided by a predetermined number of users, the response is considered validated. Alternatively, the computer-implemented method 300 may provide the user's response to another user or users and request that the other user(s) verify the user's response. In one embodiment, in order for a user to play, the user must first validate another user's response.

At step 310, the computer-implemented method 300 updates the user's score or points based on the user's input. In one embodiment, the score may be based on the usefulness and/or accuracy of the user's response. Other non-limiting criteria may include length and/or use of esoteric graph entities. In one embodiment, points may be deducted from a user's score for undesirable answers and/or if it is determined that a user is not properly validating another user's response. In an embodiment, the computer-implemented method 300 may also update a leaderboard based on the updated scores. If the user's response has been validated, the computer-implemented method 300 updates the knowledge graph 120 at step 312. In an embodiment, the computer-implemented method 300 automatically generates an RDF triple or other knowledge graph insertion code containing the new entities and/or relations for modifying the knowledge graph 120.

Figure 4:
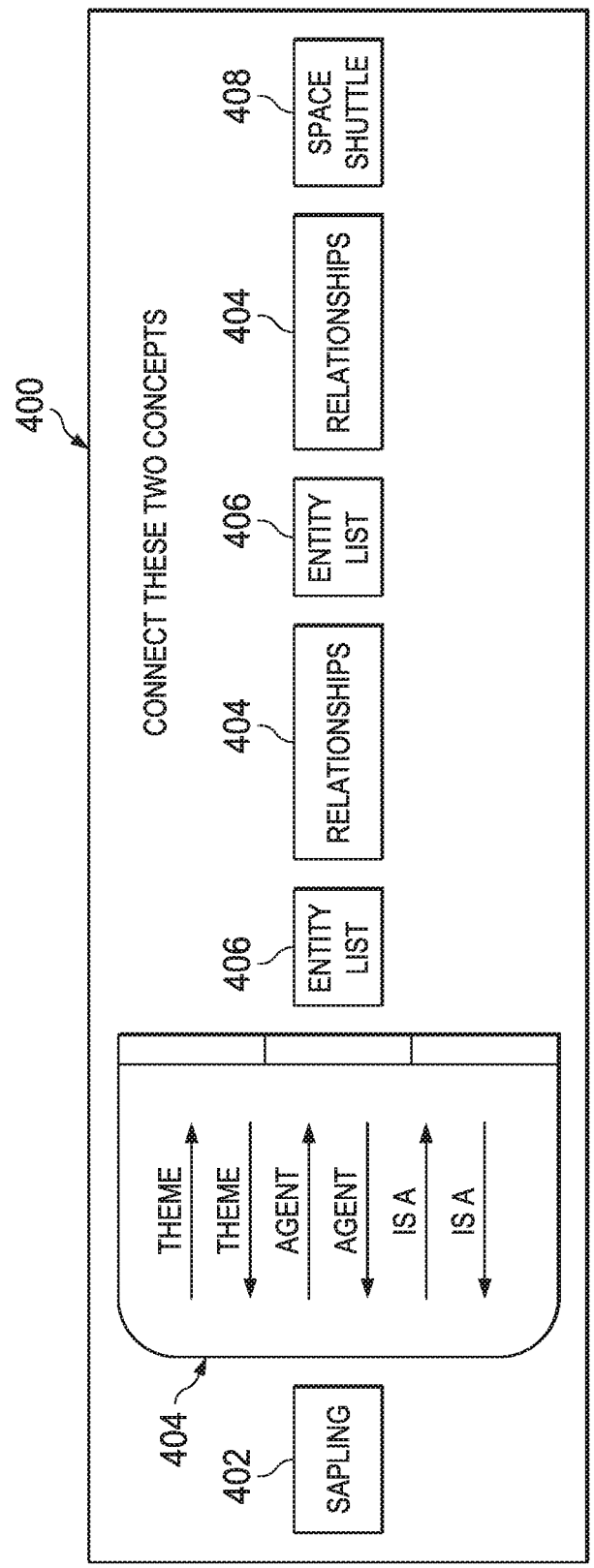
FIG. 4 is a user interface for gathering information for improving a knowledge graph according to an embodiment of the present disclosure.

FIG. 4 is an example of a user interface 400 for gathering information for improving a knowledge graph according to an embodiment of the present disclosure. In an embodiment, the user interface 400 may be implemented by a processor as shown in FIG. 5 by executing instructions associated with the game module 140 as described in FIG. 1. In the depicted embodiment, the user interface 400 request user information between entity pair "sapling" 402 and "space shuttle" 408. The user interface 400 may also include one or more sets of relationships 404 and entities 406 that a user may select from to build a path between entity pair "sapling" 402 and "space shuttle" 408. In one embodiment, the user interface 400 may include a button, not shown, that enables a user to add an additional entity/relationship to the user interface for generating longer paths. In an embodiment, the user may also have the option to add new entities and/or relationships that are not part of the predefined relationships 404 and entities 406 sets. Using the given example, the user may first select from relationships 404 "is-a →" and "tree" from entity list 406 to connect sapling 402 to tree. Continuing on, the user may select "theme-of →" to connect "tree" to the entity "burn". The user again may then select "theme-of →" to connect "burn" to the entity "rocket fuel." Finally, the user may select the relationship "part of" to connect "rocket fuel" to "space shuttle" to complete the path from "sapling" 402 to "space shuttle" 408 (i.e., Sapling-is-a→Tree-theme-of-→burn-theme-of→rocket fuel-part-of→space shuttle). Other variations of the user interface 400 may be employed in accordance with the disclosed embodiments. For example, in one embodiment, the user interface 400 may employ a graph or tree like structure for enabling a user build a path between two entities.

FIG. 5 is a block diagram of an example data processing system in which aspects of the illustrative embodiments may be implemented. Data processing system 500 is a simplistic example of a computer that can be applied to implement the processes of the disclosed embodiments. However, the disclosed embodiments may also be implemented in very advance systems such as an IBM® Power 750 servers or the IBM Watson® supercomputer, which employs a cluster of ninety IBM Power 750 servers, each of which uses a 3.5 GHz POWER7 eight-core processor, with four threads per core.

In the depicted example, data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP). A computer bus, such as bus 532 or bus 534, may be implemented using any type of communication fabric or architecture that provides for a transfer of data between different components or devices attached to the fabric or architecture.

In the depicted example, LAN adapter 516 connects to SB/ICH 510. Audio adapter 530, keyboard and mouse adapter 522, modem 524, read-only memory (ROM) 526, hard disk drive (HDD) 512, compact disk read-only memory (CD-ROM) drive 514, universal serial bus (USB) ports and other communication ports 518, and peripheral component interconnect/peripheral component interconnect express (PCI/PCIe) devices 520 connect to SB/ICH 510 through bus 532 and bus 534. PCI/PCIe devices may include, for example, Ethernet adapters, add-in cards, and PC cards for notebook computers. PCI uses a card bus controller, while PCIe does not. ROM 526 may be, for example, a flash basic input/output system (BIOS). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. Super I/O (SIO) device 528 may be connected to SB/ICH 510. In some embodiments, HDD 512 may be replaced by other forms of data storage devices including, but not limited to, solid-state drives (SSDs).

An operating system runs on processor(s) 502. The operating system coordinates and provides control of various components within the data processing system 500 in FIG. 5. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on data processing system 500.

Data processing system 500 may include a single processor 502 or may include a plurality of processors 502. Additionally, processor(s) 502 may have multiple cores. For example, in one embodiment, data processing system 500 may employ a large number of processors 502 that include hundreds or thousands of processor cores. In some embodiments, the processors 502 may be configured to perform a set of coordinated computations in parallel.

Instructions for the operating system, applications, and other data are located on storage devices, such as one or more HDD 512, and may be loaded into main memory 504 for execution by processor(s) 502. In certain embodiments, HDD 512 may include a knowledge graph in the form of a triplestore or RDF store for the storage and retrieval of RDF triples through semantic queries. In some embodiments, additional instructions or data may be stored on one or more external devices. The processes for illustrative embodiments of the present invention may be performed by processor(s) 502 using computer usable program code, which may be located in a memory such as, for example, main memory 504, ROM 526, or in one or more peripheral devices 512 and 514.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be apparent from the foregoing that the disclosed embodiments have significant advantages over current art. As an example, the disclosed embodiments utilize actual questions to determine the useful and missing information from a knowledge graph. Thus, the knowledge graph is not filled simply with irrelevant information. This improves the efficiency of the system because the system is able to perform a query faster on a smaller knowledge graph than a large one, and at the same time, the knowledge graph should include the desired information. Another advantage is that the disclosed embodiments utilize a game implementation that benefits from various users contributing information to the knowledge graph in a fun way. Compared to other knowledge-extension techniques, the human labor expense is greatly reduced with the disclosed embodiments. Additionally, knowledge can be gathered cheaply from people with more widely available technical skills. Moreover, the symbiotic relationship between the discovery tool and the game platform creates a virtuous cycle where the use of the discovery tool improves the game platform by providing puzzle content, and the use of the game platform in turn improves the discovery tool by increasing the coverage of the knowledge graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving the functionality of a system, the computer-implemented method comprising:
receiving a question;
determining a first entity and a second entity from the question;
determining whether a knowledge gap exists between the first entity and the second entity in the knowledge graph, wherein the knowledge gap exists when there is less than a predetermined number of connection paths (N) between the first entity and the second entity that are within a predetermined number of hops (M);

performing a request to collect information to correct the knowledge gap in the knowledge graph in response to a determination that the knowledge gap exists between the first entity and the second entity in the knowledge graph;

receiving the information based on the request;

validating the information; and updating the knowledge graph based on the information in response to the information being validated to improve the functionality of the system for answering questions as compared to the functionality of the system prior to the knowledge graph being updated.

2. The computer-implemented method of claim 1, wherein values for N and M are determined based on a statistical analysis of the knowledge graph to identify a number of connection paths and a number of hops between entities that provide useful knowledge.

3. The computer-implemented method of claim 1, wherein the request for information is implemented in a gaming application.

4. The computer-implemented method of claim 3, wherein validating the information is performed by comparing the information to other user's responses to the request.

5. The computer-implemented method of claim 4, wherein validating the information is performed by providing the information to a second user of the gaming application and requesting that the second user validate the information.

6. The computer-implemented method of claim 4, wherein points are accrued by a user of the gaming application based on a quality of the information provided by the user.

7. The computer-implemented method of claim 4, wherein the information is a connection path between the first entity and the second entity, and wherein the connection path comprises at least a third entity between the first entity and the second entity.

8. The computer-implemented method of claim 7, further comprising restricting the third entity based on a list of entities that cannot be part of the connection path.

9. A system comprising a processor configured to execute instructions to:

receive a question;

determine a first entity and a second entity from the question;

determine whether a knowledge gap exists between the first entity and the second entity in the knowledge graph, wherein the knowledge gap exists when there is less than a predetermined number of connection paths (N) between the first entity and the second entity that are within a predetermined number of hops (M);

perform a request to collect information to correct the knowledge gap in the knowledge graph in response to a determination that the knowledge gap exists between the first entity and the second entity in the knowledge graph;

receive the information based on the request;

validate the information; and update the knowledge graph based on the information in response to the information being validated to improve the functionality of the system for answering questions as compared to the functionality of the system prior to the knowledge graph being updated.

10. The system of claim 9, wherein the request for information is implemented in a gaming application.

11. The system of claim 10, wherein validating the information is performed by comparing the information to other user's responses to the request.

12. The system of claim 10, wherein validating the information is performed by providing the information to a second user of the gaming application and requesting that the second user validate the information.

13. The system of claim 10, wherein points are accrued by a user of the gaming application based on a quality of the information provided by the user.

14. The system of claim 10, wherein the information is a connection path between the first entity and the second entity, and wherein the connection path comprises at least a third entity between the first entity and the second entity.

15. The system of claim 14, wherein the processor further executes instructions to restrict at least one of the third entity and a relationship based on a restriction list.

16. A computer program product for modifying a knowledge graph, the computer program product comprising a computer readable storage medium having program instructions embodied therewith, the program instructions executable by a processor to cause the processor to:

receive a question;

determine a first entity and a second entity from the question;

determine whether a knowledge gap exists between the first entity and the second entity in the knowledge graph, wherein the knowledge gap exists when there is less than a predetermined number of connection paths (N) between the first entity and the second entity that are within a predetermined number of hops (M); and perform a corrective action to correct the knowledge gap in the knowledge graph in response to a determination that the knowledge gap exists between the first entity and the second entity in the knowledge graph, thereby improving the functionality of the system for answering questions as compared to the functionality of the system prior to the knowledge graph being updated.

17. The computer program product of claim 16, wherein values for N and M are determined based on a statistical analysis of the knowledge graph to identify a number of connection paths and a number of hops between entities that provide useful knowledge.

* * * * *